United States Patent [19]
Stallmann

[11] Patent Number: 5,580,176
[45] Date of Patent: Dec. 3, 1996

[54] SEALING ASSEMBLY FOR CLUTCH RELEASE BEARING

[75] Inventor: John C. Stallmann, Macomb, Mich.

[73] Assignee: Federal-Mogul Corporation, Southfield, Mich.

[21] Appl. No.: 522,814

[22] Filed: Sep. 1, 1995

[51] Int. Cl.[6] .................................................. F16C 33/78
[52] U.S. Cl. ........................ 384/482; 384/486; 384/607
[58] Field of Search .................................. 192/98, 110 B; 384/607, 609, 612, 477, 484, 486, 482

[56] References Cited

U.S. PATENT DOCUMENTS

| | | | |
|---|---|---|---|
| 2,766,082 | 10/1956 | Ritchey | 384/484 |
| 3,519,316 | 7/1970 | Gothberg . | |
| 3,752,544 | 8/1973 | Hay . | |
| 3,797,899 | 3/1974 | Anderson . | |
| 3,813,102 | 5/1974 | Derman . | |
| 3,856,368 | 12/1974 | Andersen . | |
| 4,043,620 | 8/1977 | Otto . | |
| 4,533,265 | 8/1985 | Woodbridge | 384/484 |
| 4,605,318 | 8/1986 | Kaiser . | |
| 4,645,362 | 2/1987 | Orte . | |
| 4,822,183 | 4/1989 | Lederman . | |
| 4,838,402 | 6/1989 | Feser . | |
| 5,017,024 | 5/1991 | Clark et al. . | |
| 5,119,446 | 6/1992 | Grafstrom et al. . | |
| 5,133,609 | 7/1992 | Ishiguro . | |
| 5,232,292 | 8/1993 | Stacking et al. . | |

FOREIGN PATENT DOCUMENTS

| | | | |
|---|---|---|---|
| 0276877 | 8/1988 | European Pat. Off. | 384/477 |
| 1177863 | 4/1959 | France | 384/486 |
| 1919431 | 10/1969 | Germany | 384/477 |

Primary Examiner—Daniel P. Stodola
Assistant Examiner—Matthew A. Kaness
Attorney, Agent, or Firm—Lawrence J. Shurupoff

[57] ABSTRACT

Two annular sealing members are mounted at opposite ends of an anti-friction bearing to prevent leakage of lubricant out of the bearing. One of the sealing members includes a rigid annular plate having a molded elastomeric protuberance extending into an annular groove in an end surface of an inner race of the anti-friction bearing. The protuberance maintains concentricity and limits radial shifting between the sealing element and the bearing assembly.

3 Claims, 1 Drawing Sheet

5,580,176

SEALING ASSEMBLY FOR CLUTCH RELEASE BEARING

BACKGROUND OF THE INVENTION

1. Field of the Invention

This invention relates to automotive clutch release mechanisms, and particularly to a lubricant sealing system for a self-aligning clutch release bearing.

2. Description of Prior Developments

In certain manual transmissions for automotive vehicles, a clutch release mechanism is provided to enable shifting from one gear ratio to another. Commonly, such a clutch release mechanism includes an annular carrier for an anti-friction bearing that is in selective pressure contact with an annular clutch disc. Typically, the clutch disc has a plurality of resilient fingers engaged with the anti-friction bearing so that axial motion of the bearing exerts pressure on the resilient fingers to release and disengage the clutch.

The annular carrier for the anti-friction bearing is supported on a stationary guide shaft so that an axial force on the carrier produces the desired axial motion of the anti-friction bearing. The axial force is provided by a pivotable yoke that is operably connected to a clutch pedal.

Commonly, the anti-friction bearing is mounted on the carrier so as to be radially adjustable or shiftable to compensate for misalignments that can occur between the clutch disc and the carrier axis. Pressure contact between the clutch disc and the anti-friction bearing causes one race of the bearing to be effectively locked to the clutch disc. The bearing can thereby rotate with the clutch disc while being slightly eccentric relative to the carrier, assuming some radial misalignment between the carrier and the clutch.

In some clutch release mechanisms, an axially acting spring is positioned between the carrier and one race of the anti-friction bearing. The spring provides an axial preload force that eliminates axial play between the bearing and the carrier while still permitting the bearing to shift radially to compensate for misalignments between the carrier and the clutch disc.

Also, in many clutch release mechanisms, a sealing system is provided for trapping lubricant within the annular space occupied by the anti-friction elements, i.e. the balls or rollers. The trapped lubricant reduces the coefficient of friction and also transfers heat from the friction surfaces thereby increasing the service life of the bearing. In some cases, the sealing system has failed due to the failure of a radial lip seal to maintain sealing contact between the inner and outer races of the bearing.

SUMMARY OF THE INVENTION

The present invention relates to a clutch release mechanism that includes an annular anti-friction bearing movably mounted on an axially movable carrier so that the bearing can shift radially to compensate for minor misalignments between the clutch axis and the carrier movement axis. An axially acting spring is positioned between the carrier and one race of the bearing to eliminate axial play between the carrier and the bearing.

The anti-friction bearing is provided with a lubricant seal system that prevents the escape of lubricant from the bearing and limits relative movement between a lubricant seal and the bearing races. The seal system includes an annular sealing member which includes a relatively rigid flat annular plate seated against a radial surface of the inner race, and an elastomeric sealing lip molded onto the annular plate for sealing contact with a second radial surface on the outer race.

The annular sealing member is effectively locked to the inner race of the bearing by a molded elastomeric projection or protuberance extending from the flat annular plate into an annular groove in the aforementioned radial surface of the inner race. The sealing member is thus specially configured for ready attachment to the inner race of the bearing. Preferably, the molded protuberance is of sufficient axial dimension as to have sealing engagement with an end surface of the annular groove, such that the sealing member exerts an auxiliary sealing action on the inner race of the bearing.

The invention is particularly directed to the annular sealing member and its movable mounting relationship to the anti-friction bearing. In particular, the sealing member is relatively free to move within predetermined limits with respect to both the inner and outer races of the clutch release bearing. Further features and details of the invention will become apparent from the attached drawings and accompanying description of an illustrative embodiment of the invention.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the Drawings.

In the various figures of the drawings, like reference characters designate like parts.

DETAILED DESCRIPTION OF THE PREFERRED EMBODIMENTS

Figure 1:
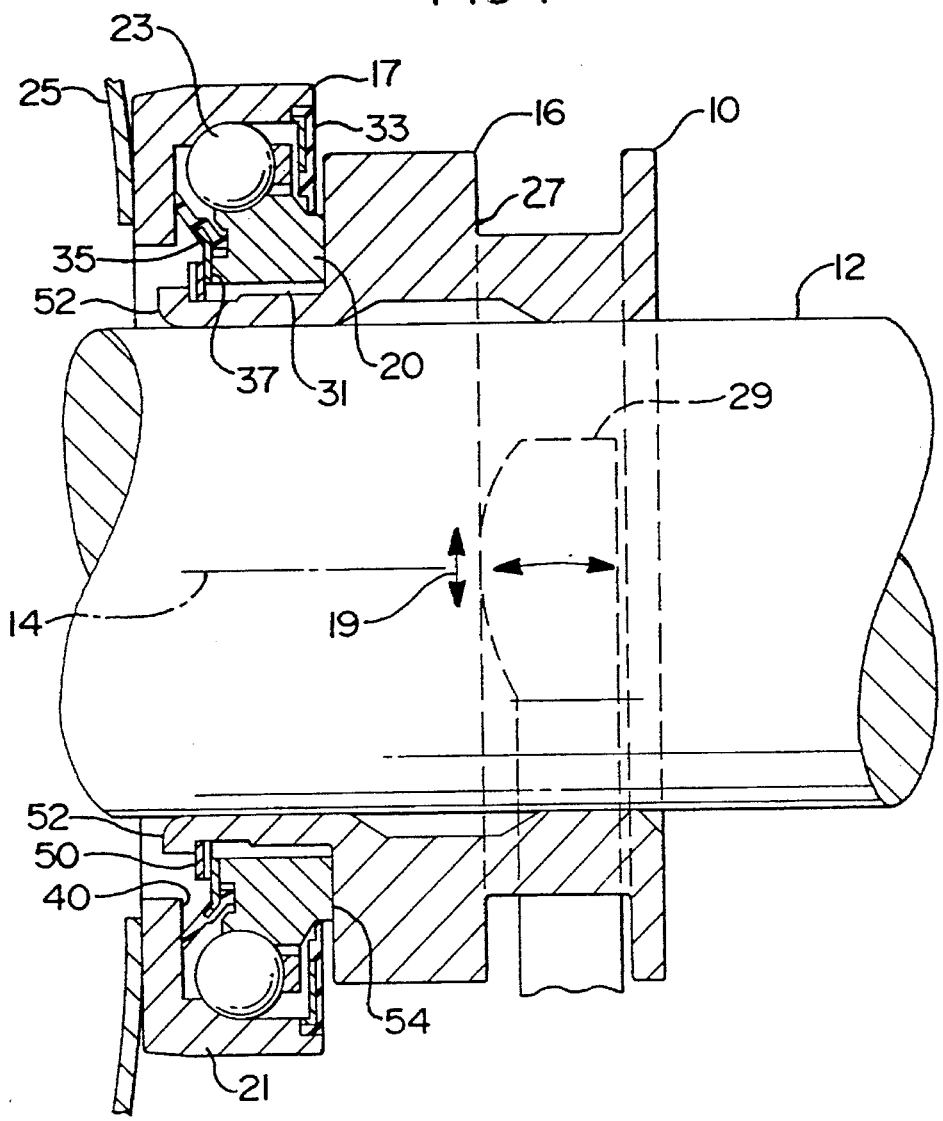
FIG. 1 is a sectional view taken through a clutch release mechanism constructed according to the invention.

Referring to FIG. 1, there is shown a clutch release mechanism 10 that includes a stationary guide shaft 12 having an axis 14 aligned on the axis of an automotive transmission. Slidably mounted on guide shaft 12 is an annular carrier 16 for an anti-friction bearing 17.

Carrier 16 can move axially along axis 14 but not rotatably. Anti-friction bearing 17 moves with carrier 16 in an axial sense, but floats radially via a movable mounting on the shaft so as to be potentially shiftable radially as indicated by arrows 19 in FIG. 1. The outer race of the anti-friction bearing is rotatable relative to the inner race.

Anti-friction bearing 17 includes an inner race 20, an outer race 21, and a complement of anti-friction balls 23 interposed between the two races, such that the outer race can rotate relative to the inner race. The outer race of the ant-friction bearing is in pressure contact with fingers 25 of a clutch disc, such that leftward axial motion of the carrier 16 increases the pressure of the race on fingers 25 thereby disengaging the clutch.

The face 27 of an annular groove formed in carrier 16 is in contact with a yoke-type lever 29 that is connected with the clutch pedal on the vehicle. When a vehicle driver depresses a clutch pedal, the lever 29 swings in a leftward arc to move carrier 16 leftwardly on the stationary guide shaft 12 thereby enabling the anti-friction bearing 17 to effect a release or disengagement of the clutch. When the driver removes foot pressure on the clutch pedal, the clutch disc fingers 25 exert sufficient rightward force on the anti-friction bearing 17 to return the bearing and carrier to their initial positions with the clutch in the engaged condition.

The outer race 21 of the bearing rotates with the clutch disc and fingers 25 due to the pressure contact between race 21 and the clutch fingers 25. The inner race 20 is non-rotatable due to its axially biased abutment with carrier 16, as detailed further below. An annular clearance 31 between the inner surface of race 20 and the cylindrical registering surface of carrier 16 allows the bearing 17 to shift radially as indicated by arrows 19. Such radial shifting of the bearing compensates for any misalignment of the clutch and the stationary guide shaft 12.

Lubricant is retained in the anti-friction bearing by two annular sealing members 33 and 35. Sealing member 33 is press fit into an annular recess in the right face of race 21 so that its inner annular edge rides on the inner race 20 to seal against lubricant escape in a left-to-right direction.

The present invention is primarily concerned with sealing member 35 and its relationship to the inner and outer races of the anti-friction bearing. Sealing member 35 includes a relatively rigid flat annular plate 37 formed of steel or other relatively rigid or non-resilient material.

Figure 2:
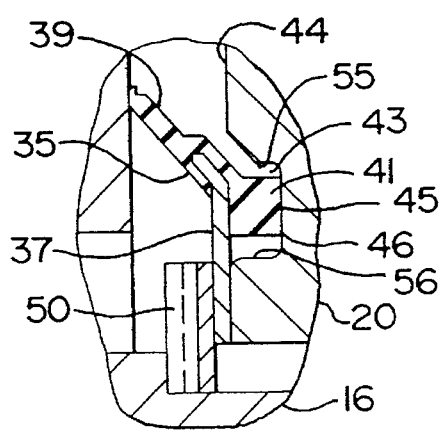
FIG. 2 is a fragmentary enlarged sectional view of a structural detail used in the FIG. 1 mechanism.

As shown in FIG. 2, molded onto plate 37 is an elastomeric element that forms an annular sealing lip 39 engaged with radial surface 40 on outer race 21. The molded elastomeric element further includes an annular protuberance 41 that extends from plate 37 into an annular groove 43 formed in the left face 44 of inner race 20.

Preferably, the axial dimension of protuberance 41 is slightly greater than the corresponding axial depth of groove 43, such that the end surface 45 of the elastomeric protuberance is in pressure contact with internal end surface 46 of the groove. The compressed elastomeric protuberance therefore provides an auxiliary seal to prevent escape of lubricant from the bearing along the radial interface between plate 37 and the left face of race 20. The cooperative action of sealing members 33 and 35 traps lubricant within the bearing while permitting the outer race 21 to rotate relative to the inner race 20.

An annular wave spring 50, or equivalent spring device, is positioned between flat plate 37 and a radial flange 52 on carrier 16 to prevent axial play between the carrier and the anti-friction bearing, in addition to controlling the force required to radially misalign the bearing relative to carrier 16.

Flange 52 may be formed after the bearing and seal members 33 and 35 have been assembled together and positioned on the carrier. The flanging operation is continued to a point where the wave spring is in a partially compressed condition.

Wave spring 50 exerts a rightward force on annular plate 37 and the inner race of the bearing so that the right face of inner race 20 is in firm frictional contact with shoulder surface 54 on the carrier. The wave spring thereby eliminates axial play between the bearing and the carrier, while permitting the bearing to shift or adjust radially as indicated by arrows 19 to compensate for misalignments between the clutch axis and the carrier axis.

The force of wave spring 50 is sufficient to keep plate 37 against end surface 45 of the inner race. Protuberance 41 is slightly compressed to provide sealing contact with the groove end surface 46. Protuberance 41 preferably has a clearance relationship with the side surfaces 55 and 56 of the groove 43 to ensure good sealing contact between the protuberance and groove end surface 46. The clearance relationship also overcomes any manufacturing tolerances that might vary the size of the protuberance or its placement relative to the groove.

A primary function of the protuberance 41 is to prevent excessive radial movement of sealing member 35 relative to races 20 and 21 of the anti-friction bearing. Should the bearing assembly move radially relative to sealing member 35, the protuberance 41 will contact side surfaces 55 and 56 of the groove 43 to prevent undesired non-concentricity of the bearing relative to the seal member. Protuberance 41 serves as a locator to maintain concentricity between the bearing and seal member 35 and also as an auxiliary seal against groove end surface 45.

Figure 3:
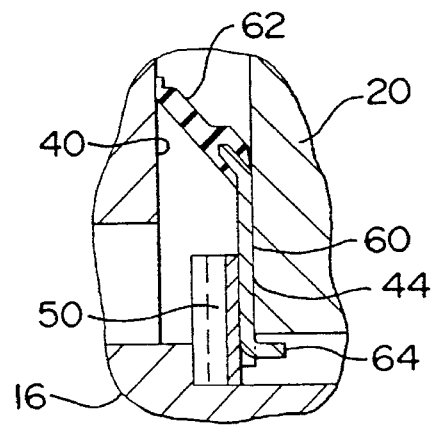
FIG. 3 is a sectional view taken in the same direction as FIG. 2, but illustrating a prior art arrangement.

FIG. 3 shows a sealing member construction used prior to the present invention. The sealing member includes a rigid annular plate 60 having an elastomeric sealing lip 62 molded around its outer edge area so that the free edge of the sealing lip is in sealing contact with radial surface 40 on the outer race of the bearing.

Plate 60 is biased into contact with radial surface 44 on inner race 20 by a wave spring 50. Six tabs or ears 64 are formed on plate 60 to maintain the plate and anti-friction bearing in a concentric relationship.

Although the arrangement of FIG. 3 performs reasonably well, it does not provide a complete lubricant seal at the interface between plate 60 and the associated surface 44 on race 20. The metal-to-metal contact at 60,44 does not provide a complete seal under all possible manufacturing conditions. Leakage is possible across the interface in some circumstances.

A principal problem with the FIG. 3 arrangement relates to manufacturing difficulties. During the molding operation that forms the sealing lip 62 on annular plate 60, the annular plate is positioned as an insert in the mold cavity. Proper positioning of the annular plate necessitates that tabs 64 be located in a groove in one of the mold members. Should tabs 64 not be properly positioned in the groove for any reason, closure of the mold cavity can cause breakage of the tabs producing a defective sealing member. Of possibly greater importance is the fact that the loose metal debris or metal fragments can damage the mold surfaces.

The tooling used to mold the sealing member of FIG. 2 is somewhat less complicated and more failure resistant than the tooling required to mold the FIG. 3 sealing member. The overall cost to manufacture the FIG. 2 sealing member is thus potentially less than that for the FIG. 3 sealing member. Also, the FIG. 2 arrangement operates in an improved fashion.

The drawings necessarily show a specific embodiment of the invention. However, it can be appreciated that some variations and configurational changes can be made while still practicing the invention.

Obviously, numerous modifications and variations of the present invention are possible in the light of the above teachings. It is therefore to be understood that within the scope of the appended claims, the invention may be practiced otherwise than as specifically described herein.

What is claimed is:

1. An anti-friction bearing assembly, comprising:

carrier;

an inner race, an outer race, and a plurality of anti-friction elements rollably interposed between said races and carried by said carrier;

a spring carried by said carrier and biasing said inner race against said carrier;

said inner race comprising a first radial surface; said outer race comprising a second radial surface; said first and second radial surfaces being in confronting relation; said first radial surface having an annular groove formed therein; and a seal comprising an annular sealing member radially slidably mounted on said first radial surface; said sealing member comprising a relatively rigid flat annular plate biased against said first radial surface by said spring, and an annular elastomeric element molded onto said annular plate; said elastomeric element comprising a sealing lip engaged against said second radial surface, and an annular protuberance extending into said annular groove and limiting radial sliding movement of said sealing member against said inner race.

2. The bearing assembly of claim 1, wherein said annular groove has an internal annular end surface, and said annular protuberance has sealing engagement with said internal end surface.

3. The bearing assembly of claim 1, wherein said annular groove has an internal end surface and two side surfaces extending from said end surface to said first radial surface; said annular protuberance having sealing contact with said groove end surface and clearance relationships with said groove side surfaces.

* * * * *